United States Patent
Labaj et al.

(10) Patent No.: US 10,466,901 B1
(45) Date of Patent: *Nov. 5, 2019

(54) INTERACTIVE TIERING PREFERENCES MAP

(71) Applicant: EMC IP Holding Company LLC, Hopkinton, MA (US)

(72) Inventors: Donald E. Labaj, Northborough, MA (US); Kendra Marchant, Arlington, MA (US); Rhon Porter, Sutton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,091

(22) Filed: Sep. 18, 2017

Related U.S. Application Data

(63) Continuation of application No. 14/868,676, filed on Sep. 29, 2015, now Pat. No. 9,798,465.

(51) Int. Cl.
| | |
|---|---|
| *G06F 12/00* | (2006.01) |
| *G06F 13/00* | (2006.01) |
| *G06F 3/06* | (2006.01) |
| *G06F 3/0486* | (2013.01) |
| *G06F 3/0484* | (2013.01) |

(52) U.S. Cl.
CPC .......... *G06F 3/0605* (2013.01); *G06F 3/0486* (2013.01); *G06F 3/04842* (2013.01); *G06F 3/04847* (2013.01); *G06F 3/0635* (2013.01); *G06F 3/0664* (2013.01); *G06F 3/0689* (2013.01)

(58) Field of Classification Search
CPC ........ G06F 12/00; G06F 13/00; G06F 3/0605; G06F 3/069; G06F 3/0486; G06F 3/04842; G06F 3/0635; G06F 3/0689; G06F 3/0664; G06F 3/04847
USPC .......................... 711/100, 112, 114, 154, 200
See application file for complete search history.

(56) References Cited

U.S. PATENT DOCUMENTS

| | | | |
|---|---|---|---|
| 8,429,346 B1* | 4/2013 | Chen ...................... | G06F 3/0613 709/213 |
| 9,513,814 B1* | 12/2016 | Can ......................... | G06F 3/061 |
| 2014/0324860 A1* | 10/2014 | Rogers .................. | G06F 3/0665 707/736 |

\* cited by examiner

*Primary Examiner* — Tuan V Thai

(74) *Attorney, Agent, or Firm* — Muirhead and Saturnelli, LLC

(57) ABSTRACT

Described are techniques for performing data storage management operations. A graphical user interface display includes multiple each associated with a tiering preference. The graphical user interface includes multiple user interface elements representing a plurality of logical devices. Each user interface element denotes a logical device located in one of the plurality of areas to thereby indicate any of a tiering preference and a tiering requirement for the logical device. First processing is performed to modify a tiering preference for a first logical device where the first processing includes selecting the first logical device by selecting a user interface element representing the first logical device, and moving the first user interface element from a first of the areas, denoting a first tiering preference, to a second of the area, denoting a second tiering preference.

18 Claims, 12 Drawing Sheets

INTERACTIVE TIERING PREFERENCES MAP

RELATED APPLICATIONS

This application is a continuation of U.S. application Ser. No. 14/868,676 filed Sep. 29, 2015 (pending), which is hereby incorporated by reference.

BACKGROUND

Technical Field

This application generally relates to data storage, and more particularly user interfaces used in connection with data storage.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the invention is a method of performing data storage management operations comprising: displaying a graphical user interface including a plurality of areas each associated with one of a plurality of tiering preferences, said graphical user interface including a plurality of user interface elements representing a plurality of logical devices, each of the plurality of user interface elements denoting one of the plurality of logical devices located in one of the plurality of areas to thereby indicate any of a tiering preference and a tiering requirement for said one logical device; and performing first processing to modify a tiering preference for a first of the plurality of logical devices, said first processing including: selecting the first logical device by selecting a first of the plurality of user interface elements representing the first logical device; and moving the first user interface element from a first of the plurality of areas to a second of the plurality of areas, the first area denoting a first tiering preference and the second area denoting a second tiering preference where a current tiering preference for the first logical device is modified from the first tiering preference to the second tiering preference. The plurality of logical devices may be included in a data storage system including a plurality of storage tiers and wherein the plurality of tiering preferences may include the plurality of storage tiers. The plurality of tiering preferences may include an automated tiering preference denoting that no particular one of the plurality of storage tiers is preferred for storing data of a logical device. The method may include determining, by a data storage optimizer, a data movement to automatically move a first data portion from a first of the plurality of tiers to a second of the plurality of storage tiers, the data movement being determined using information including any of I/O workload of data portions of the plurality of logical devices and tiering preferences for the plurality of logical devices. A second of the plurality of user interface elements may represent a tiering requirement for a second of the plurality of logical devices, the second user interface element being included in one of the plurality of areas associated with one of the plurality of tiering preferences, and wherein the second user interface element may include a visual indicator denoting that the one tiering preference is a tiering requirement for the second logical device. Data of the second logical device may be stored only on a storage tier associated with the one tiering preference and the data storage optimizer may not relocate data for the second logical device. The graphical user interface may provide a map of tiering preferences and tiering requirements for the plurality of logical devices. Each of the plurality of user interface elements may be encoded with information denoting which one or more of the plurality of storage tiers includes data of one of the plurality of logical devices associated with said each user interface element. The first user interface element may be encoded with information denoting that data of the first logical device is included in at least two of plurality of different storage tiers. The first user interface element may include a plurality of partitioned each being associated with one of the at least two different storage tiers and wherein said each partition may have a relative size denoting an amount of data of the first logical device stored on said one storage tier associated with said each partition. The second tiering preference may indicate a storage tier of physical storage devices having a corresponding capacity and wherein the method may include determining whether a total capacity of the plurality of logical devices included in the second area exceeds the corresponding capacity; and responsive to determining that the total capacity of the plurality of logical devices included in the second area exceeds the corresponding capacity, displaying a notification to a user on the graphical user interface. The method may include specifying one or more filtering criteria; and selecting the plurality of logical devices from a set of logical devices in accordance with the one or more filtering criteria. The one or more filtering criteria may include any of: select a number of logical devices from the set based on storage capacity, select a number of logical devices from the set based on I/O workload, and select a number of logical devices associated with a specified application. At least one of the logical devices may have an associated metadata tag identifying that the at least one logical device is associated with a particular application. At least one of the logical devices may be associated with a particular application identified in an I/O operation received from the particular application.

In accordance with another aspect of the invention is a system comprising a processor; and a memory comprising code stored thereon that, when executed, performs a method of performing data storage management operations comprising: displaying a graphical user interface including a plurality of areas each associated with one of a plurality of tiering preferences, said graphical user interface including a plurality of user interface elements representing a plurality of logical devices, each of the plurality of user interface elements denoting one of the plurality of logical devices located in one of the plurality of areas to thereby indicate any of a tiering preference and a tiering requirement for said one logical device; and performing first processing to modify a tiering preference for a first of the plurality of logical devices, said first processing including: selecting the first logical device by selecting a first of the plurality of user interface elements representing the first logical device; and moving the first user interface element from a first of the plurality of areas to a second of the plurality of areas, the first area denoting a first tiering preference and the second area denoting a second tiering preference where a current tiering preference for the first logical device is modified from the first tiering preference to the second tiering preference.

In accordance with another aspect of the invention is a computer readable medium comprising code stored thereon that, when executed performs a method of performing data storage management operations comprising: displaying a graphical user interface including a plurality of areas each associated with one of a plurality of tiering preferences, said graphical user interface including a plurality of user interface elements representing a plurality of logical devices, each of the plurality of user interface elements denoting one of the plurality of logical devices located in one of the plurality of areas to thereby indicate any of a tiering preference and a tiering requirement for said one logical device; and performing first processing to modify a tiering preference for a first of the plurality of logical devices, said first processing including: selecting the first logical device by selecting a first of the plurality of user interface elements representing the first logical device; and moving the first user interface element from a first of the plurality of areas to a second of the plurality of areas, the first area denoting a first tiering preference and the second area denoting a second tiering preference where a current tiering preference for the first logical device is modified from the first tiering preference to the second tiering preference. The plurality of logical devices may be included in a data storage system including a plurality of storage tiers and wherein the plurality of tiering preferences may include the plurality of storage tiers. The plurality of tiering preferences may include an automated tiering preference denoting that no particular one of the plurality of storage tiers is preferred for storing data of a logical device. The method may include determining, by a data storage optimizer, a data movement to automatically move a first data portion from a first of the plurality of tiers to a second of the plurality of storage tiers, the data movement being determined using information including any of I/O workload of data portions of the plurality of logical devices and tiering preferences for the plurality of logical devices.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
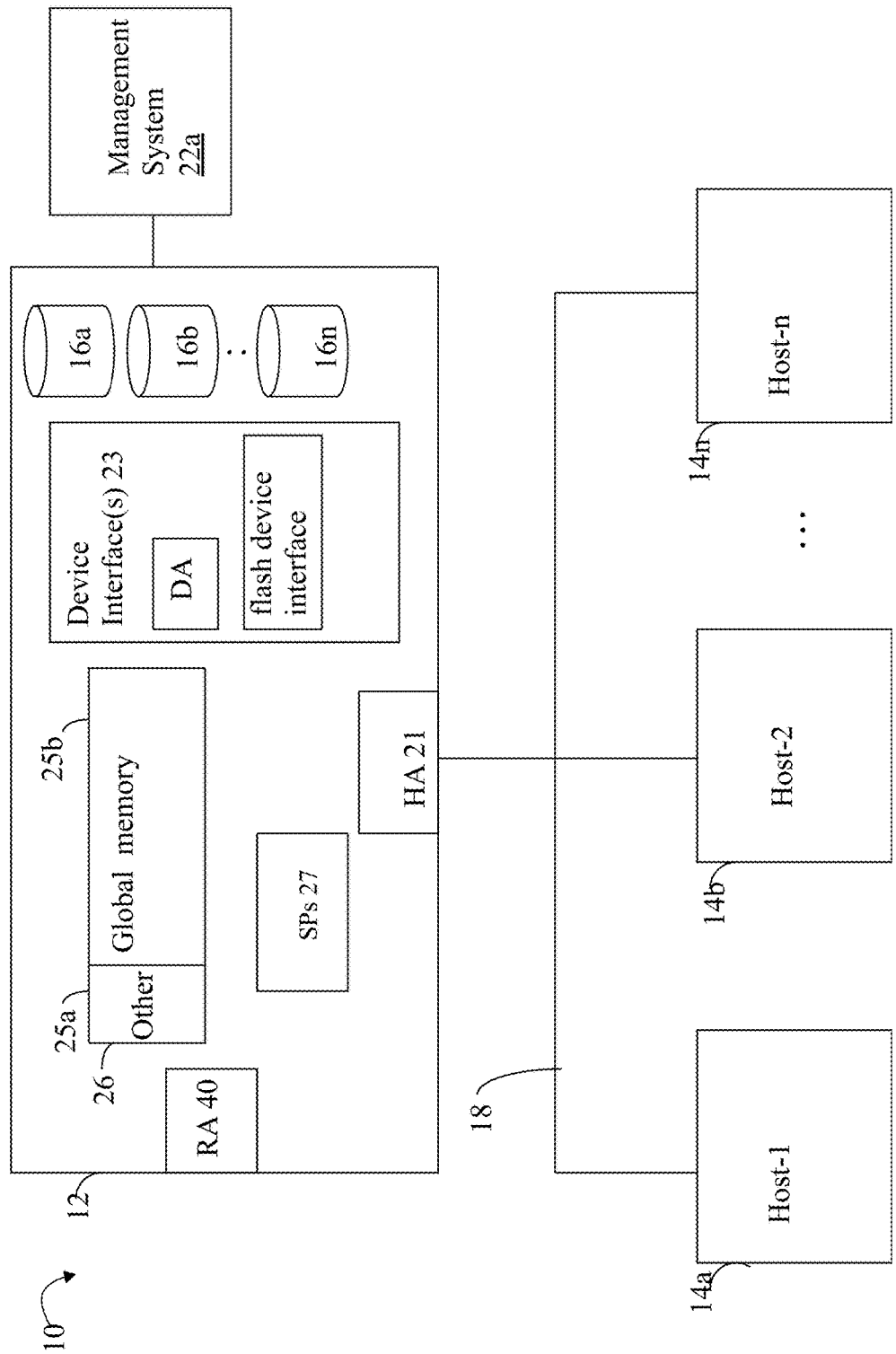
FIGS. 1 and 3 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes or properties. The attributes may include any one or more of a storage type or storage technology, device performance characteristic(s), RAID (Redundant Array of Independent Disks) group configuration, storage capacity, and the like. RAID groups are known in the art. The PDs of each RAID group may have a particular RAID level (e.g., RAID-1, RAID-5 3+1, RAID-5 7+1, and the like) providing different levels of data protection. For example, RAID-1 is a group of PDs configured to provide data mirroring where each data portion is mirrored or stored on 2 PDs of the RAID-1 group. The storage type or technology may specify whether a physical storage device is an SSD (solid state drive) drive (such as a flash drive), a particular type of SSD drive (such using flash memory or a form of RAM), a type of rotating magnetic disk or other non-SSD drive (such as a 10K RPM rotating disk drive, a 15K RPM rotating disk drive), and the like. Performance characteristics may relate to different performance aspects of the physical storage devices of a particular type or technology. For example, there may be multiple types of rotating disk drives based on the RPM characteristics of the disk drives where disk drives having different RPM characteristics may be included in different storage tiers. Storage capacity may specify the amount of data, such as in bytes, that may be stored on the drives. An embodiment may define one or more such storage tiers. For example, an embodiment in accordance with techniques herein that is a multi-tiered storage system may define two storage tiers including a first tier of all SSD drives and a second tier of all non-SSD drives. As another example, an embodiment in accordance with techniques herein that is a multi-tiered storage system may define three storage tiers including a first tier of all SSD drives which are flash drives, a second tier of all 15K RPM rotating disk drives, and a third tier of all 10K RPM rotating disk drives. In terms of general expected performance, the SSD or flash tier may be considered the highest performing tier. The second tier of 15K RPM disk drives may be considered the second or next highest performing tier and the 10K RPM disk drives may be considered the lowest or third ranked tier in terms of expected performance. The foregoing are some examples of tier definitions and other tier definitions may be specified and used in an embodiment in accordance with techniques herein. For example, storage tier may include a different type of solid state storage drives besides flash-based drives. For example, a storage tier may include phase change memory drives.

Figure 2:
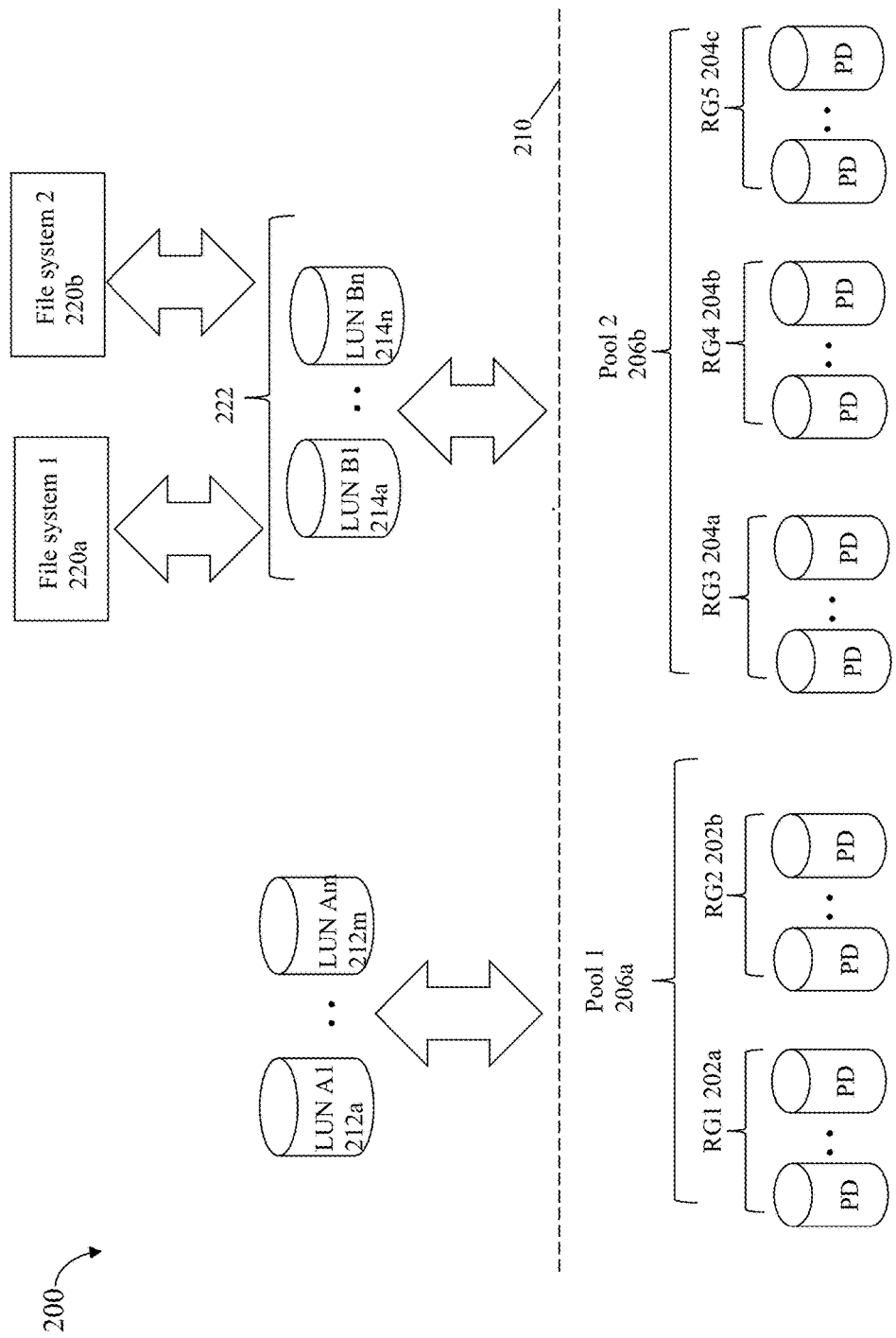
FIG. 2 is an example illustrating physical and logical views of entities in connection with storage in an embodiment in accordance with techniques herein.

In a data storage system in an embodiment in accordance with techniques herein, PDs may be configured into a pool or group of physical storage devices where the data storage system may include many such pools of PDs such as illustrated in FIG. 2. Each pool may include one or more configured RAID groups of PDs.

Depending on the particular embodiment, each pool may also include only PDs of the same storage tier with the same type or technology, or may alternatively include PDs of different storage tiers with different types or technologies. For example, with reference to FIG. 2, a first pool, pool 1 2016a, may include a first RAID group (RG) of 10K RPM rotating disk drives (denoted as RG1 202a) of one storage tier and also include a second RG of flash-based drives (denoted as RG2 202b) of another storage tier. A second pool, pool 2 206b, may include 3 RGs (denoted RG3 204a, RG 4 204b and RG 5 204c) each of which includes only flash-based drives of the foregoing other storage tier.

The components illustrated in the example 200 below the line 210 may be characterized as providing a physical view of storage in the data storage system and the components illustrated in the example 200 above the line 210 may be characterized as providing a logical view of storage in the data storage system. The pools 206a-b and RGs 202a-b, 204a-c of the physical view of storage may be further configured into one or more logical entities, such as LUNs or logical devices. For example, LUNs 212a-m may be configured from pool 1 206a and LUNs 214a-n may be configured from pool 206b.

A data storage system may support one or more different types of logical devices presented as LUNs. For example, a data storage system may provide for configuration of thick or regular LUNs and also virtually provisioned or thin LUNs. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity. The granularity or the amount of storage provisioned at a time for virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time.

Thin devices and thin provisioning, also referred to respectively as virtually provisioned devices and virtual provisioning, are described in more detail, for example, in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, and U.S. Pat. No. 7,949,637, Issued May 24, 2011, Storage Management for Fine Grained Tiered Storage with Thin Provisioning, to Burke, both of which are incorporated by reference herein.

It should be noted that the total usable capacity denoting a total logical capacity of LUNs (where at least one of the LUNs is a thin LUN) configured from a pool may exceed the physical capacity of the underlying PDs. For example, the total usable capacity denoting the total logical capacity of LUNs 212a-m, which includes at least one thin LUN, may exceed the amount of physical storage capacity of PDs of the pool 1 206a. Similarly, the total usable capacity denoting the total logical capacity of LUNs 214a-n, which includes at least one thin LUN, may exceed the amount of physical storage capacity of PDs of the pool 2 206b. The amount by which the total logical capacity or total usable capacity of all LUNs in a specified set exceeds the physical storage capacity, such as of a pool, may be referred to as an oversubscribed capacity.

LUNs configured from a pool may be further mapped to one or more other logical entities. For example, referring again to FIG. 2, group 222 of LUNs 214a-n may be configured as thin or virtually provisioned LUNs which are used to provide physical storage for file systems, such as file system 1 220a and file system 2 220b. The file systems 220a-b may be any suitable file system known in the art such as an NFS (Network File System) file system or a CIFS (Common Internet File System) file system.

Figure 3:
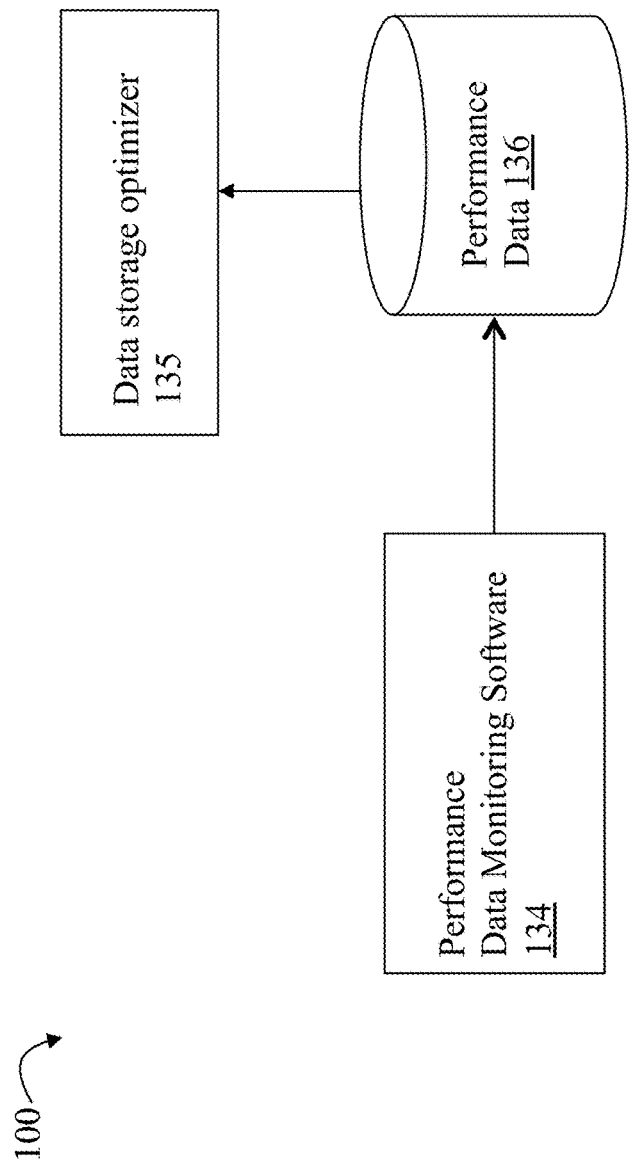

Referring to FIG. 3, shown is an example 100 of components that may be used in an embodiment in connection with techniques herein. The example 100 includes performance data monitoring software 134 which gathers performance data about the data storage system. The software 134 may gather and store performance data 136. This performance data 136 may also serve as an input to other software, such as used by the data storage optimizer 135 in connection with performing data storage system optimizations, which attempt to enhance the performance of I/O operations, such as those I/O operations associated with data storage devices 16a-16n of the system 12 (as in FIG. 1). For example, the performance data 136 may be used by a data storage optimizer 135 in an embodiment in accordance with techniques herein. The performance data 136 may be used in determining and/or optimizing one or more statistics or metrics such as may be related to, for example, an I/O workload for one or more physical devices, a pool or group of physical devices, logical devices or volumes (e.g., LUNs), thin or virtually provisioned devices (described in more detail elsewhere herein), portions of thin devices, and the like. The I/O workload may also be a measurement or level of "how busy" a device is, for example, in terms of I/O operations (e.g., I/O throughput such as number of I/Os/ second, response time (RT), and the like). Examples of workload information and other information that may be obtained and used in an embodiment in accordance with techniques herein are described in more detail elsewhere herein.

In one embodiment in accordance with techniques herein, components of FIG. 3, such as the performance monitoring software 134, performance data 136 and/or data storage optimizer 135, may be located and execute on a system or processor that is external to the data storage system. As an alternative or in addition to having one or more components execute on a processor, system or component external to the data storage system, one or more of the foregoing components may be located and execute on a processor of the data storage system itself.

The response time for a storage device or volume may be based on a response time associated with the storage device or volume for a period of time. The response time may be based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the back-end (e.g., physical device) operations of read and write with respect to a LUN, thin device, and the like, may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular type of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read cache miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes (or more generally I/O operations), may refer to the read and write requests or commands performed by the DA. Such read and write commands may correspond, respectively, to physical device accesses such as disk reads and writes that may result from a host I/O request received by an HA 21.

The optimizer 135 may perform processing to determine how to allocate or partition physical storage in a multi-tiered environment for use by multiple applications. The optimizer 135 may also perform other processing such as, for example, to automatically determine what particular portions of LUNs, such as thin devices, to store on physical devices of a particular tier, evaluate when to move data between physical drives of different tiers, and the like. The data storage optimizer 135 may then automatically perform processing to accordingly perform one or more data movements to relocate or store identified data portions on different storage tiers. It should be noted that the optimizer 135 may generally represent one or more components that perform processing as described herein as well as one or more other optimizations and other processing that may be performed in an embodiment.

The data storage optimizer 135 in an embodiment in accordance with techniques herein may perform processing to determine what data portions of devices such as thin devices to store on physical devices of a particular tier in a multi-tiered storage environment. Such data portions of a thin device may be automatically placed in a storage tier. The data portions may also be automatically relocated or moved to a different storage tier as the I/O workload and observed performance characteristics for the data portions change over time. In accordance with techniques herein, analysis of I/O workload for data portions of thin devices may be performed in order to determine whether particular data portions should have their data contents stored on physical devices located in a particular storage tier.

Promotion may refer to movement of data from a first storage tier to a second storage tier where the second storage tier is characterized as having devices of higher performance than devices of the first storage tier. Demotion may refer generally to movement of data from a first storage tier to a second storage tier where the first storage tier is characterized as having devices of higher performance than devices of the second storage tier. As such, movement of data from a first tier of flash devices to a second tier of 15K RPM devices and/or 7.2K RPM devices may be characterized as a demotion and movement of data from the foregoing second tier to the first tier a promotion.

The data storage optimizer in an embodiment in accordance with techniques herein may perform data movement optimizations generally based on any one or more data movement criteria. For example, in a system including 3 storage tiers with tier 1 of flash drives, tier 2 of 15K RPM disk drives and tier 3 of 10K RPM disk drives, the criteria may include identifying and placing at least some of the busiest data portions having the highest I/O workload on the highest performance storage tier, such as tier 1—the tier flash-based—in the multi-tiered storage system. The data movement criteria may include identifying and placing at least some of the coldest/most inactive data portions having the lowest I/O workload on the lowest or lower performance storage tier(s), such as any of tiers 2 and tier 3. As another example, the data movement criteria may include maintaining or meeting specified service level objectives (SLOs). An SLO may define one or more performance criteria or goals to be met with respect to a set of one or more LUNs where the set of LUNs may be associated, for example, with an application, a customer, a host or other client, and the like. For example, an SLO may specify that the average I/O RT (such as measured from the front end or HA of the data storage system) should be less than 5 milliseconds (ms.). Accordingly, the data storage optimizer may perform one or more data movements for a particular LUN of the set depending on whether the SLO for the set of LUNs is currently met. For example, if the average observed I/O RT for the set of one or more LUNs is 6 ms. the data storage optimizer may perform one or more data movements to relocate data portion(s) of any of the LUNs, such as currently located in tier 3, to a higher performance storage tier, such as tier 1. Data portions of a LUN may be initially placed or located in a storage tier based on an initial placement or allocation policy. Subsequently, as data operations are performed with respect to the different data portions and I/O workload data collected, data portions may be automatically relocated or placed in different storage tiers having different performance characteristics as the observed I/O workload or activity of the data portions change over time. In such an embodiment using the data storage optimizer, it may be beneficial to identify which data portions currently are hot (active or having high I/O workload or high level of I/O activity) and which data portions are cold (inactive or idle with respect to I/O workload or activity). Identifying hot data portions may be useful, for example, to determine data movement candidates to be relocated to another storage tier. For example, if trying to improve performance because and SLO is violated, it may be desirable to relocate or move a hot data portion of a LUN currently stored on a low performance tier to a higher performance tier to increase overall performance for the LUN.

An embodiment may use a data storage optimizer such as, for example, EMC® Fully Automated Storage and Tiering for Virtual Pools (FAST VP) by EMC Corporation, providing functionality as described herein for such automated evaluation and data movement optimizations. For example, different techniques that may be used in connection with the data storage optimizer are described in U.S. patent application Ser. No. 13/466,775, filed May 8, 2012, PERFORMING DATA STORAGE OPTIMIZATIONS ACROSS MULTIPLE DATA STORAGE SYSTEMS, which is incorporated by reference herein.

In at least one embodiment in accordance with techniques herein, one or more I/O statistics may be observed and collected for individual partitions, or slices of each LUN, such as each thin or virtually provisioned LUN. The logical address space of each LUN may be divided into partitions each of which corresponds to a subrange of the LUN's logical address space. Thus, I/O statistics may be maintained for individual partitions or slices of each LUN where each such partition or slice is of a particular size and maps to a corresponding subrange of the LUN's logical address space.

An embodiment may have different size granularities or units. For example, consider a case for a thin LUN having a first logical address space where I/O statistics may be maintained for a first slice having a corresponding logical address subrange of the first logical address space. The embodiment may allocate physical storage for thin LUNs in allocation units referred to as chunks. In some cases, there may be multiple chunks in a single slice (e.g. where each chunk may be less than the size of a slice for which I/O statistics are maintained). Thus, the entire corresponding logical address subrange of the first slice may not be mapped to allocated physical storage depending on what logical addresses of the thin LUN have been written to. Additionally, the embodiment may perform data movement or relocation optimizations based on a data movement size granularity. In at least one embodiment, the data movement size granularity or unit may be the same as the size of a slice for which I/O statistics are maintained and collected.

Figure 4:
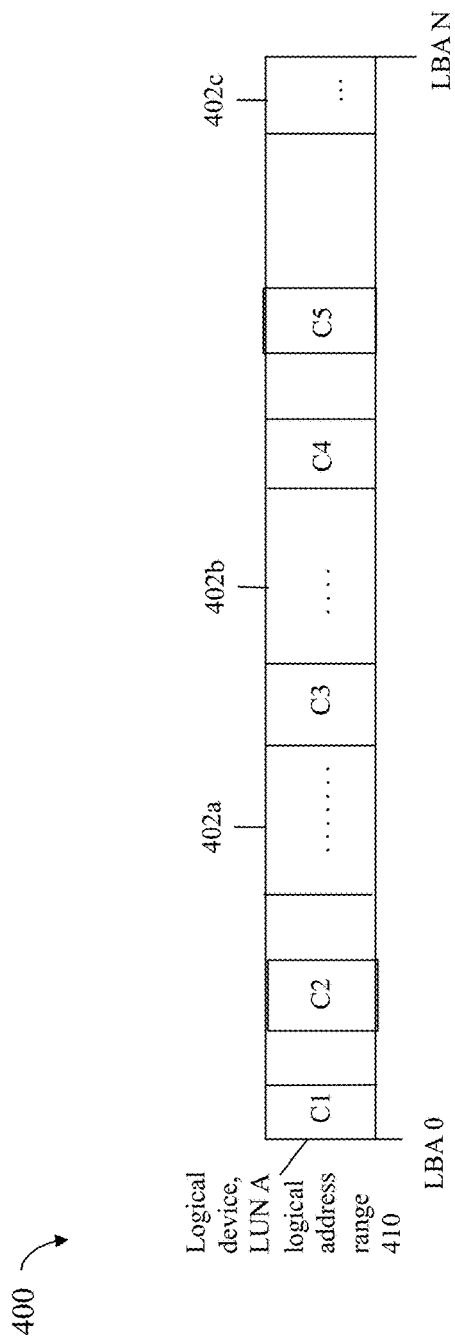
FIG. 4 is an example illustrating partitioning of a logical address space into slices of various sizes in an embodiment in accordance with techniques herein.

In at least one data storage system in accordance with techniques described herein such as illustrated in FIG. 4, a fixed size slice may be used for each thin LUN's logical address space 410. For example, the size of each slice (e.g., denoted for example as C1-C5 in the example 400) may be 256 megabytes (MB) thereby denoting that I/O statistics are collected for each 256 MB portion of logical address space and where data movement optimizations are performed which relocate or move data portions which are 256 MB in size. Thus, a set of I/O statistics may be collected per slice which is then analyzed to determine data movement candidates. For example, in one embodiment, the I/O statistic used to measure the average temperature, I/O activity or I/O workload may be expressed in I/Os per second (IOPS). It should be noted that more generally, any suitable I/O statistic may be used. Additionally, in one embodiment, I/O workload may be expressed as a normalized I/O workload or as an I/O workload density where the unit of storage (denoting a logical address space portion) may be 1 GB although more generally, any suitable unit of storage may be used. Thus, based on the foregoing, an embodiment may determine the I/O statistic such as the average number of IOPS/GB for a particular logical address space portion. More generally, the average number of IOPS/GB represents the average I/O workload density per GB of storage as may be used in an embodiment in accordance with techniques herein as used in following examples. Elements 402a-c may denote portions of the logical address space not mapped to allocated storage in a thin or virtually provisioned device's logical address range 410.

In at least one embodiment, data storage management software having a graphical user interface (GUI) may be used in connection with performing data storage system management operations. Examples of data storage system management operations may include provisioning storage for a LUN, specifying or modifying preferences or other settings for individual LUNs by a user interacting with the GUI, and the like. Such preferences may include, for example, identifying a preferred storage tier for storing data of the LUN, whether automated storage tiering (autotiering) is performed for the LUN whereby the data storage optimizer decides where to place data portions of the LUN and the user has no single preferred storage tier, whether a LUN is "pinned" to a tier (e.g., where pinning a LUN to a tier tells the system to leave the LUN on the specified tier regardless of I/O activity, and the like).

Described in following paragraphs are techniques that may be used in connection with a GUI of the data storage system management software. The GUI may be used in connection with performing operations such as just noted above and also elsewhere herein. The GUI may provide a user with overviews regarding various aspects of the storage tiers such as using icons for the various LUNs having provisioned storage. A user may interact with the GUI to view and then possibly modify existing settings or preferences regarding one or more LUNs.

Figure 5:
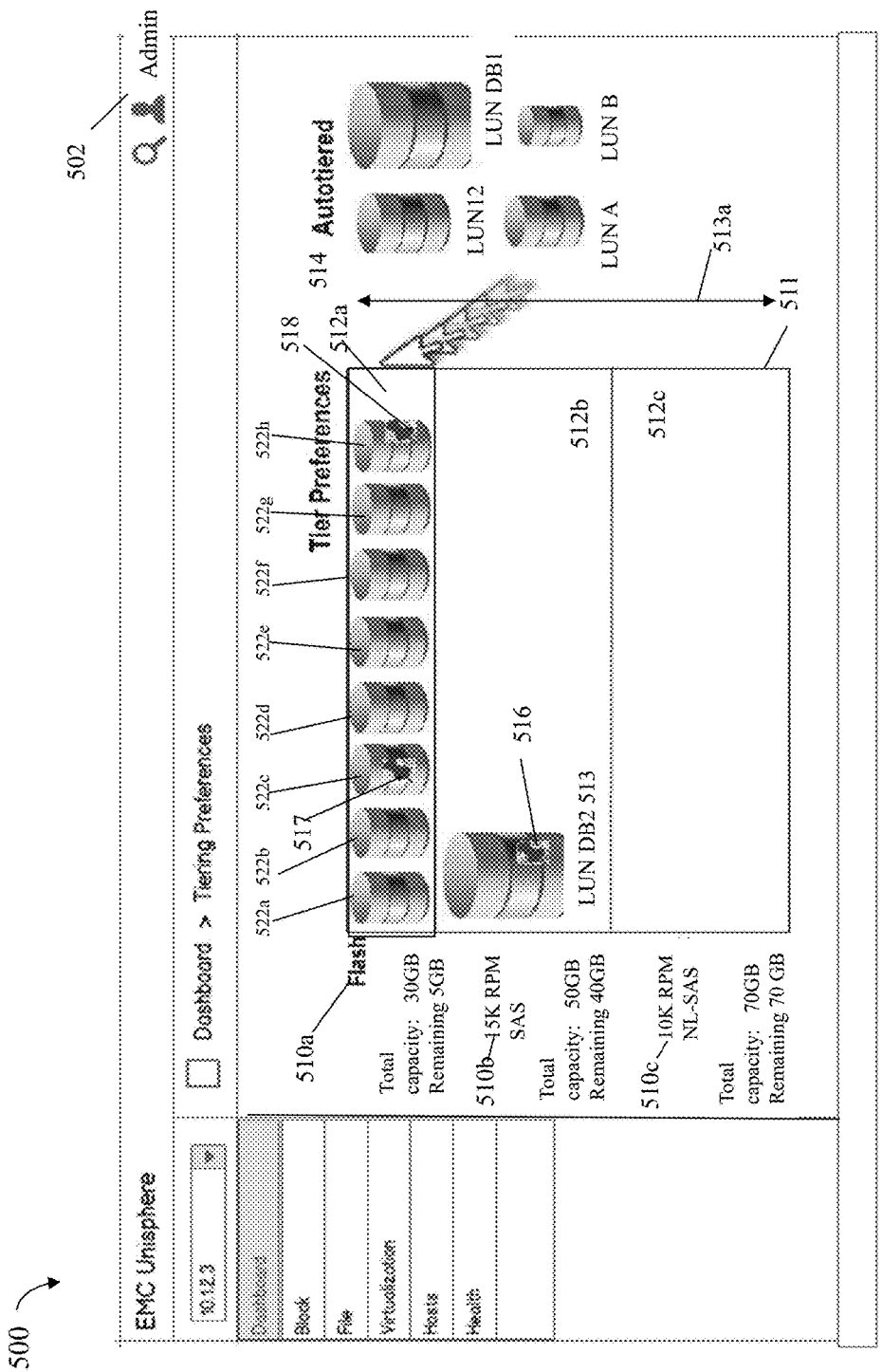
FIGS. 5, 6, 6B, 7, 7B and 8 are examples of user interfaces that may be used in an embodiment in accordance with techniques herein.

Referring to FIG. 5, shown is a first example of a GUI that may be used in an embodiment in accordance with techniques herein. The example 500 is a GUI that may be presented to user that is a data storage system administrator (as denoted by 502) viewing information regarding existing LUNs, such as tiering preferences, and then interacting with the GUI to perform one or more desired operations discussed below.

The GUI 500 displays information regarding a single pool including 3 storage tiers: a highest performing flash tier 510a, a second highest performing tier 510b of 15K RPM rotating disk drives having a SAS interface, and a third lowest performing tier 510c of 10K RPM rotating disk drives having an NL-SAS interface. Additionally illustrating is another tier, denoted as autotiered 514 discussed below in more detail. Element 510a includes capacity information regarding the flash tier and indicates that the flash tier has 30 GB of storage capacity of which 5 GB remains free/available for consumption. Element 510b includes capacity information regarding the second tier, the 15K PRM SAS tier and indicates that the this tier has 50 GB of storage capacity of which 40 GB remains free/available for consumption. Element 510c includes capacity information regarding the third tier, the 10K RPM NL SAS tier, and indicates that this tier has 70 GB of storage capacity of which 70 GB remains free/available for consumption.

For each of the tiers 510a-c, the GUI displays icons, respectively, in areas 512a-c of rectangle 511, for the various LUNs for which particular storage tiers have been indicated as tier preferences. For a tiering preference specified for a LUN, the system attempts to keep the LUN on the tier but may relocate or move data of the LUN to another tier as may be needed. LUNs having a particular tier indicated as a preferences are represented by icons that are cylinders (with a cylinder per LUN) located in the areas 512a-c for the storage tiers. For example, the flash tier 510a is designated as the tiering preference for 8 LUNs having icons 522a-h as illustrated in area 512a, the second tier 510b is designated as the tiering preference for the single LUN DB2 having icon 513 as illustrated in area 512b, and the third tier 510c is not designated as the tiering preference for any LUN (as illustrated by empty area 512c having no LUN icons).

As mentioned elsewhere herein, the autotiered section 514 includes those 4 LUNs for which the user has indicates having no preferred tier (no tiering preference) for the LUN. Thus, for such 4 LUNs in the autotiered section 514, the system may be free to locate data of the LUN on any tier, such as based on temperature of I/O activity. A user may drag a LUN's icon to a particular one of the areas 512a-c or 514 to indicate or select a tiering preference for a particular LUN. For example, a user may select one of the 4 LUNs from the autotiered section 514 (e.g., such as with a mouse, pointer, stylus, pen or other selecting means on a computer system) and drag and drop the selected LUN icon in area 512b to select tier 2 15K RPM SAS as the preferred tier for the selected LUN. Similarly, a LUN having a current tiering preference other than autotiered may also be modified. For example, the second tier 510b is currently the preferred tier for LUN 513 which may be modified by selecting LUN 513 and dropping the selected LUN icon 513 in another tier's area in 511, such as area 510a or 510c. Thus, the GUI 500 may be characterized in one aspect as a tiering preference map showing tier preferences for the displayed LUNs. For a tiering preference specified for a LUN, the system attempts to keep the LUN on the tier but may relocate or move the LUN to another tier as may be needed.

The relative sizes of the LUN cylinders in the display areas 512a-c for the 3 tiers and in the autotiered section 514 show how large the various LUNs are relative to each other. For example, in the autotiered section 514, the following denotes the relative storage capacities, from largest to smallest, based on the relative sizes of the 4 LUNs in 514: LUN DB1, LUN 12, LUN A, and LUN B. In the area 512a for the flash tier 510a, there are 8 LUNs all having the same (or approximately the same) capacity since all LUN icons have the same (or approximately the same) relative size in area 512a. The LUN DB2 in area 512b is the largest of all displayed LUN icons in any of 512a-c and 514 and thus LUN DB2 513 has the largest capacity of all LUNs represented in the GUI 500.

The rectangle 511 may have an area on the display denoting 100% of the pool capacity where the relative sizes of each of the areas 512a-c denotes the relatives sizes in terms of storage capacity of each of the 3 storage tiers. For example, the flash tier 510a has the least storage capacity of 30 GB of all 3 tiers of the pool and the flash tier's associated area 512a is the smallest of all 3 areas 512a-c. Additionally, the third lowest performing tier 510c of 10K RPM drives has the largest storage capacity of 70 GB and is the largest of all 3 areas 512a-c. Furthermore, the size of 512c is more than twice the size of 512a in accordance with the fact that the third tier has more than twice the storage capacity of the first tier. In the current GUI example 500, the different relative heights of 512a-c such as along the dimension or direction 513a denotes the relative sizes of 512a-c.

A user may also "pin" a LUN to a tier which indicates that the system is required to leave all user data of the LUN in the specified pinned tier regardless of I/O activity. In other words, a LUN pinned to a tier indicates that it is a requirement that the LUN remain on the specified pinned tier. LUNs that are included in the GUI 500 in a particular tier in one of the areas 512a-c may include LUNs that are both pinned to the particular tier and also LUNs having the particular tier as a preference. In an embodiment, a tiering preference specified for a LUN may be visually distinguished from a tiering requirement for a LUN (where the LUN is pinned) such as by a visual indicator of a pin for those LUNs pinned to a particular tier. For example, the pin indicator 516 indicates that LUN DB2 is pinned to the second tier and pin indicators 517 and 518 indicate that 2 LUNs currently placed in the flash tier are pinned. Flash tier 510a includes 8 LUNs currently located in the flash tier as represented by the 8 LUN icons in area 512a. However, of the 8 LUNs in 512a, 2 LUNs have flash tier indicated as a requirement (e.g., are pinned to the flash tier) as denoted by the pins 517 and 518, with the remaining 6 LUNs (with no pin indicator) having the flash tier indicated as a tiering preference.

It should be noted that a LUN may be pinned to a desired tier, for example, by first moving the LUN's icon to the particular one of the areas 512a-c associated with the desired tier and then changing the tiering preference to a requirement for the LUN. The foregoing change from a tiering preference to requirement may be accomplished in any suitable manner. For example, in one embodiment, a user may make the foregoing change via menu selection.

Thus the GUI 500 illustrates tiering preferences and tiering requirements (pinned tier) that may be selected or modified for individual LUNs by a user interacting with the GUI 500.

It should be noted that the GUI 500 illustrates tiering preferences and tiering requirements and does not illustrate distribution of the LUN's data portions across the different storage tiers (e.g., how much of each LUN is currently stored on each particular tier). Examples of how tiering preference and actual data placement may be graphically and visually presented in a GUI display are described in following paragraphs.

When a user drags and drops a selected LUN to any of areas 512a-c to modify or set a tiering preference for the selected LUN, an embodiment in accordance with techniques herein may further alert the user to one or more conditions resulting from the selection. For example, the user may be presented with an alert message on the GUI if the total capacity of the LUNs currently having the selected tier as a tiering preference exceeds the total capacity of the tier. For example, LUN 513 in area 512b has a capacity of 40 GB. A user may drag and drop LUN 513 into area 512a to set LUN 513's tiering preference to the first flash tier. However, after this preference modification is made for LUN 513, the total capacity of the 9 LUNs in area 512a would be 70 GB which exceeds the total capacity of the 30 GB of the entire flash tier 510a. Thus, an alert message may be displayed to the user indicating the foregoing to notify the user. In response to receiving the alert message, the user may readjust the LUNs pinned to a tier, may adjust one or more LUNs for which the flash tier is indicated as a tiering preference, and the like.

It should be noted that the tiering preference specified for a LUN may be used as an input, for example, to the data storage optimizer for use in connection with performing data movement optimizations. For example, the data storage optimizer may consider 2 data portions as data movement candidates to be demoted from the flash tier to another lower performance tier. A first data portion currently stored in the flash tier may be from a first LUN having the flash tier 510a indicated as the tier preference. A second data portion currently stored in the flash tier may be from a second LUN having the second tier 15K RPM SAS drives 510b indicated as the tier preference. Assuming, for example, both of the foregoing 2 data portions have relatively the same I/O activity, the data storage optimizer may use the tiering preference of each LUN in deciding which one of the foregoing 2 data portions to demote from the flash tier to another lower performance tier. For example, the data storage optimizer may select to demote the second data portion and not the first data portion based on the indicated tiering preferences for the LUNs. Generally, a LUN that is not pinned to a particular storage tier may be managed by the data storage optimizer and thus subject to automated data movement between tiers. The particular tiering preference specified for individual LUNs may be an input to the optimizer, such as just described, and used in determining data movements.

It should be noted that in FIG. 5 and other GUIs described herein, a LUN may be initially placed or may initially appear in a default one of the tier preferences such as any of 512*a-c* and 514. For example, in one embodiment, a LUN may be included in the autotiered preference 514 by default. From here, a user may move a LUN such as by dragging and dropping the LUN as described above to modify the LUN's tiering preference.

It should be noted that the icons, buttons, and other elements included in a GUI display, such as icons representing LUNs, and the like, may be generally referred to as user interface elements.

Figure 6:
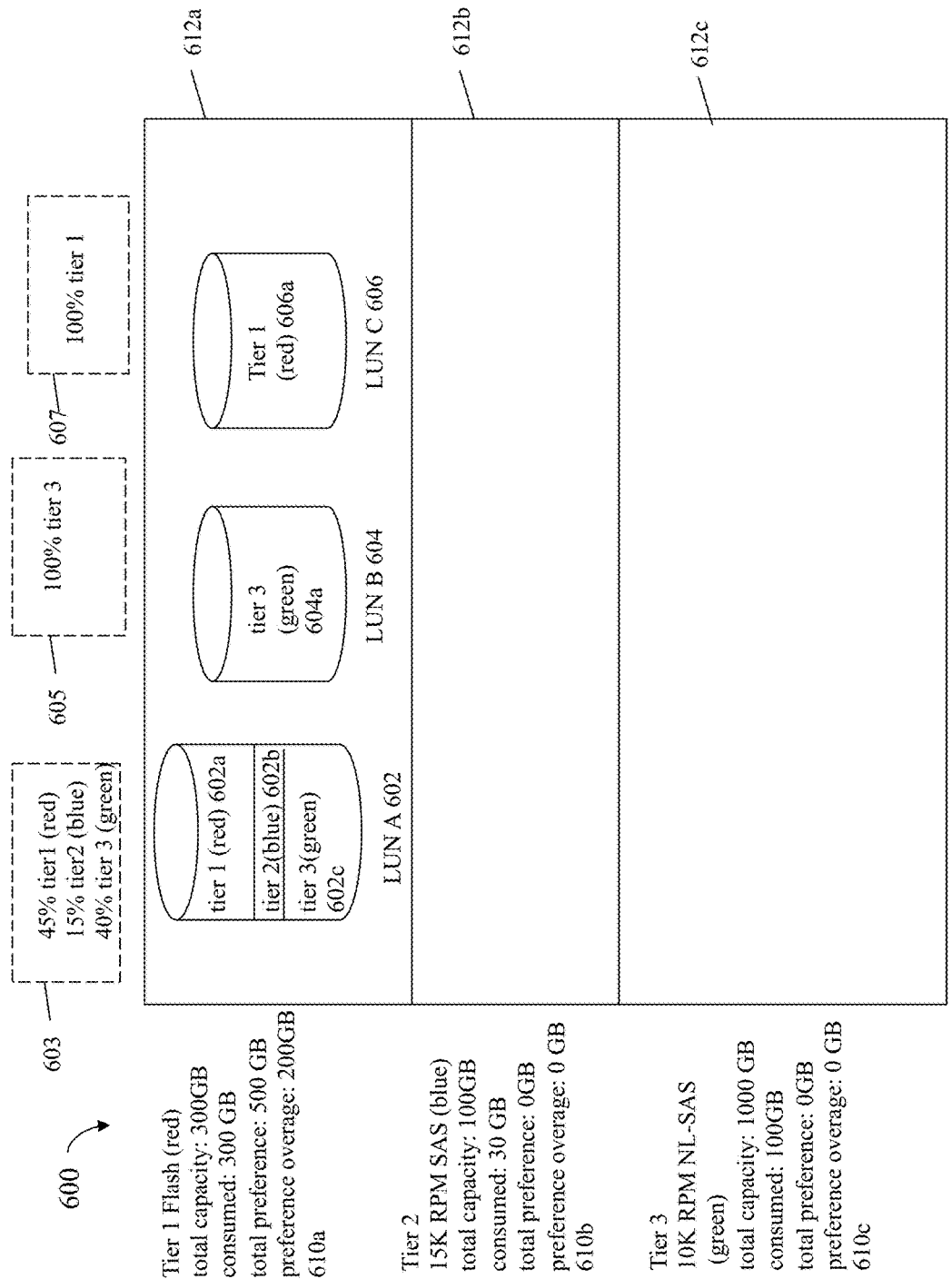

Referring to FIG. 6, shown is a second example of a GUI that may be used in an embodiment in accordance with techniques herein. The example 600 is a GUI that may be presented to user that is a data storage system administrator viewing information regarding existing LUNs, such as tiering preferences in combination with showing actual storage placement of relative amounts of data of each of the LUNs.

The example 600 includes 3 storage tiers 610*a-c* similar, respectively, to storage tiers 510*a-c* of FIG. 5. The GUI illustrates selected tiering preferences for each of the LUNs 602, 604 and 606 in a manner similar to that as described in connection with FIG. 5. Additionally, the GUI 600 indicates relative amounts of data of each LUN currently placed on the different storage tiers. Color may be used as visual indicator to further denote portions of a LUN stored on the different storage tiers. For example, a portion of a LUN stored on flash tier 1 may be encoded as red, a portion of a LUN stored on tier 2 may be encoded as blue, and a portion of a LUN stored on tier 3 may be encoded as green. For example, LUN A 602 has a tiering preference of tier 1 denoted by placement of 602 in area 612*a*. Additionally, data from LUN A 602 is distributed and stored on the 3 storage tiers as indicated by the LUN A icon 602 which includes portion 602*a* encoded in red to denote a relative portion of LUN A stored on tier 1, includes portion 602*b* encoded in blue to denote a relative portion of LUN A stored on tier 2, and includes portion 602*c* encoded in green to denote a relative portion of LUN A stored on tier 3. In one embodiment, the relative sizes of 602*a-c* may denote the relative amounts of LUN A capacity having its data stored on the various tiers. For example, based on relative sizes of 602*a-c*, there is about the same portion of LUN A's data stored on tier 1 and tier 3 and much less of LUN A's data stored on tier 2.

Element 604 denotes the icon for LUN B having tier 1 selected as its tiering preference by placement of LUN B 604 icon in area 612*a*. Element 604*a* indicates the all data of LUN B 604 is located on tier 3 despite its tiering preference of tier 1. Element 606 denotes the icon for LUN C having tier 1 selected as its tiering preference by placement of LUN C 606 icon in area 612*a*. Element 606*a* indicates the all data of LUN C 606 is located on tier 1.

Thus, color encoding of the different storage tiers may serve as a visual indicator regarding which one or more tiers a LUN's data is currently located. Further, the relative sizes of the different color encoded portions of the LUN icons 602, 604 and 606 serve as visual indicator denoting relative amounts of the LUN on each of the different storage tiers.

Additionally, further detail regarding the relative percentages of the LUN data stored on each of the different storage tiers may be provided to a user. For example, a user may interact with the GUI 600 (e.g., such as by a mouse over or other GUI event) to select a particular LUN, where responsive to such a user action, the GUI may be updated to display the relative percentages of the LUN data stored on different storage tiers. For example, responsive to moving a selection pointer over the icon for LUN A 602, element 603 may be displayed indicating that 45% of LUN A's data is stored on tier 1, 15% of LUN A's data is stored on tier 2, and 40% of LUN A's data is stored on tier 3. The information in 603 may also be color encoded with the particular colors associated with the different tiers. Responsive to moving a selection pointer over the icon for LUN B 604, element 605 may be displayed indicating that 100% of LUN b's data is stored on tier 3. The information in 605 may also be color encoded with the particular colors associated with the different tiers. Responsive to moving a selection pointer over the icon for LUN C 606, element 607 may be displayed indicating that 100% of LUN C's data is stored on tier 1. The information in 607 may also be color encoded with the particular colors associated with the different tiers.

It should also be noted that the GUI 600 includes more detailed information regarding each storage tier as denoted in 610*a*, 610*b* and 610*c*. Element 610*a* indicates, for the first tier of flash drives the following:

total capacity: 300 GB denoting tier 1 has a total capacity of 300 GB;

consumed: 300 GB denoting that 300 GB of tier 1 is consumed or used with no remaining flash storage capacity;

total preference: 500 GB indicating that the total or aggregated sum capacity of all LUNs in area 612*a* designating tier 1 as the LUN tiering preference is 500 GB;

preference overage: 200 GB indicating that the total preference is 200 GB greater than the actual tier 1 capacity. Element 610*b* indicates, for the second tier2 of 15K RPM SAS drives the following:

total capacity: 100 GB denoting tier 2 has a total capacity of 100 GB;

consumed: 30 GB denoting that 30 GB of tier 2 is consumed or used with 70 GB therefore remaining;

total preference: 0 GB indicating that the total or aggregated sum capacity of all LUNs in area 612*b* designating tier 2 as the LUN tiering preference is 0 GB;

preference overage: 0 GB indicating that the total preference is 0 GB greater than the actual tier 2 capacity.

Element 610*c* indicates, for the third tier 3 of 10K RPM NL-SAS drives the following: total capacity: 1000 GB denoting tier 3 has a total capacity of 1000 GB;

consumed: 100 GB denoting that 100 GB of tier 3 is consumed or used with 900 GB therefore remaining;

total preference: 0 GB indicating that the total or aggregated sum capacity of all LUNs in area 612*c* designating tier 3 as the LUN tiering preference is 0 GB;

preference overage: 0 GB indicating that the total preference is 0 GB greater than the actual tier 3 capacity.

The GUI 600 may represent a snapshot regarding placement of data of the LUNs 602, 604 and 606 at a point in time thus graphically illustrating placement of LUN data by the data storage optimizer at the point in time. At a later second point in time, the data storage optimizer may perform data movements such as based on dynamically changing I/O workloads directed to the different portions of the LUNs 602, 604 and 606. Accordingly, the GUI display may then be updated to accordingly reflect the revised placement of data for the LUNs 602, 604 and 606 at this second point in time.

Figure 6B:
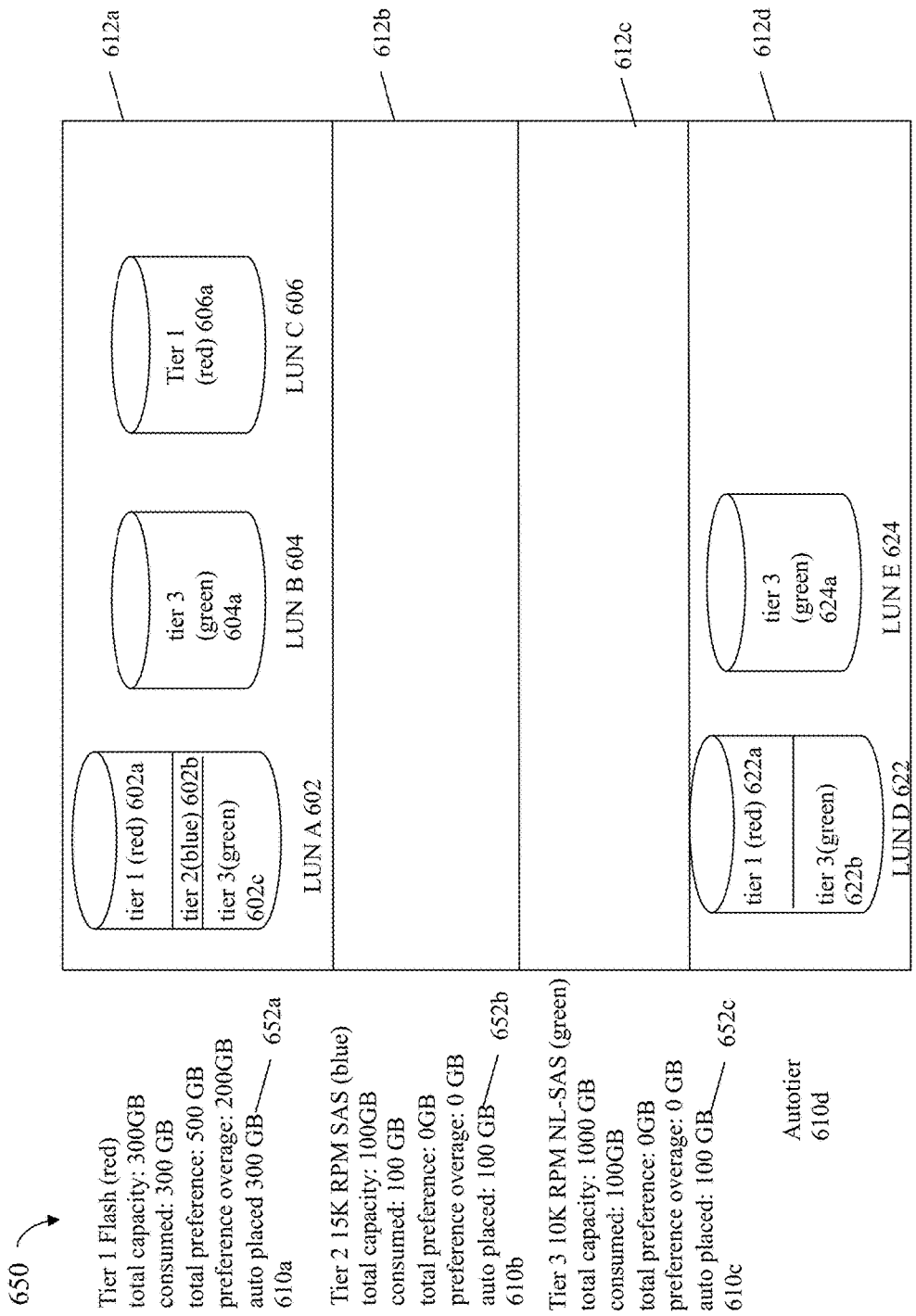

Referring to FIG. 6B, shown is a third example of a GUI that may be used in an embodiment in accordance with techniques herein. The example 650 is a GUI that may be presented to user that is a data storage system administrator viewing information regarding existing LUNs, such as tiering preferences in combination with showing actual storage placement of relative amounts of data of each of the LUNs. The GUI 650 includes the information as presented in the GUI 600 of FIG. 6 with a few additional items: an autotier preference 610d, area 612d and an item autoplaced in each of elements 610a-c.

The GUI 650 includes an additional tiering preference designation of autotier 610d in which a selected tiering preference of autotiering as described elsewhere herein is illustrated. Selecting 610d as a tiering preference is similar in function to that as described in connection with element 514 of FIG. 5. The autotiering preference may be selected by placing the LUN's icon in area 612d. For example, LUN D 622 and LUN E 624 each have autotiering as the current tiering preference as indicated by the placement of LUN icons 622, 624 in area 612d. In a manner similar to that as described in connection with LUNs 6024, 604 and 606 of FIG. 6, LUN icons 622, 624 may be used to indicate the particular storage tiers upon which data of the LUNs is currently located as well as a relative amount of the LUN data on each storage tier. For example, element 622 denotes the icon for LUN D 622 having autotiering selected as the tiering preference. Element 622a indicates approximately half LUN D's data is stored on tier1 as denoted by the red encoding of 622a as well as its relative size in comparison to 622b. Element 622b indicates approximately half LUN D's data is stored on tier3 as denoted by the green encoding of 622b as well as its relative size in comparison to 622a. Although not illustrated, a mouse over or other user interaction with respect to element 622 may result in display of percentages of each storage tier such as denoted by element 603 of FIG. 6. Element 624 denotes the icon for LUN E 624 having autotiering selected as the tiering preference. Element 624a indicates all of LUN E's data is stored on tier3 as denoted by the green encoding of 624a as well as the fact that the entire LUN icon 624 is encoded green. Although not illustrated, a mouse over or other user interaction with respect to element 624 may result in display of percentages of each storage tier such as denoted by element 603 of FIG. 6.

Elements 610a-c include storage tier information such as described in FIG. 6 with the additional item of "autoplaced" which denotes the amount of consumed storage of the tier that includes data that has been automatically placed in the storage tier, such as by the data storage optimizer. It should be noted that in at least one embodiment, data may be automatically placed by the data storage optimizer if the data is included in a LUN having the autotiering preference 610d as well as any other tiering preference 610a-d. However, a LUN indicating it is pinned to a particular tier denotes a tiering requirement whereby the data storage optimizer is not free to relocate or move the LUN data between tiers. In the example 650, the illustrated LUNS 602, 604 and 606 have tier 1 610a indicated as a tiering preference and LUNs 622 and 624 having autotiering 610d selecting indicating no tier preference. Thus, the data storage optimizer is free to move and relocate all data of all such LUNs. In this case, element 652a denotes 300 GB of the 300 GB consumed of tier 1 includes data that is placed in tier 1 as a result of automated data storage movements by the data storage optimizer. Element 652b denotes 100 GB of the 100 GB consumed of tier 2 includes data that is placed in tier 2 as a result of automated data storage movements by the data storage optimizer. Element 652c denotes 100 GB of the 1000 GB consumed of tier 3 includes data that is placed in tier 3 as a result of automated data storage movements by the data storage optimizer.

Figure 7:
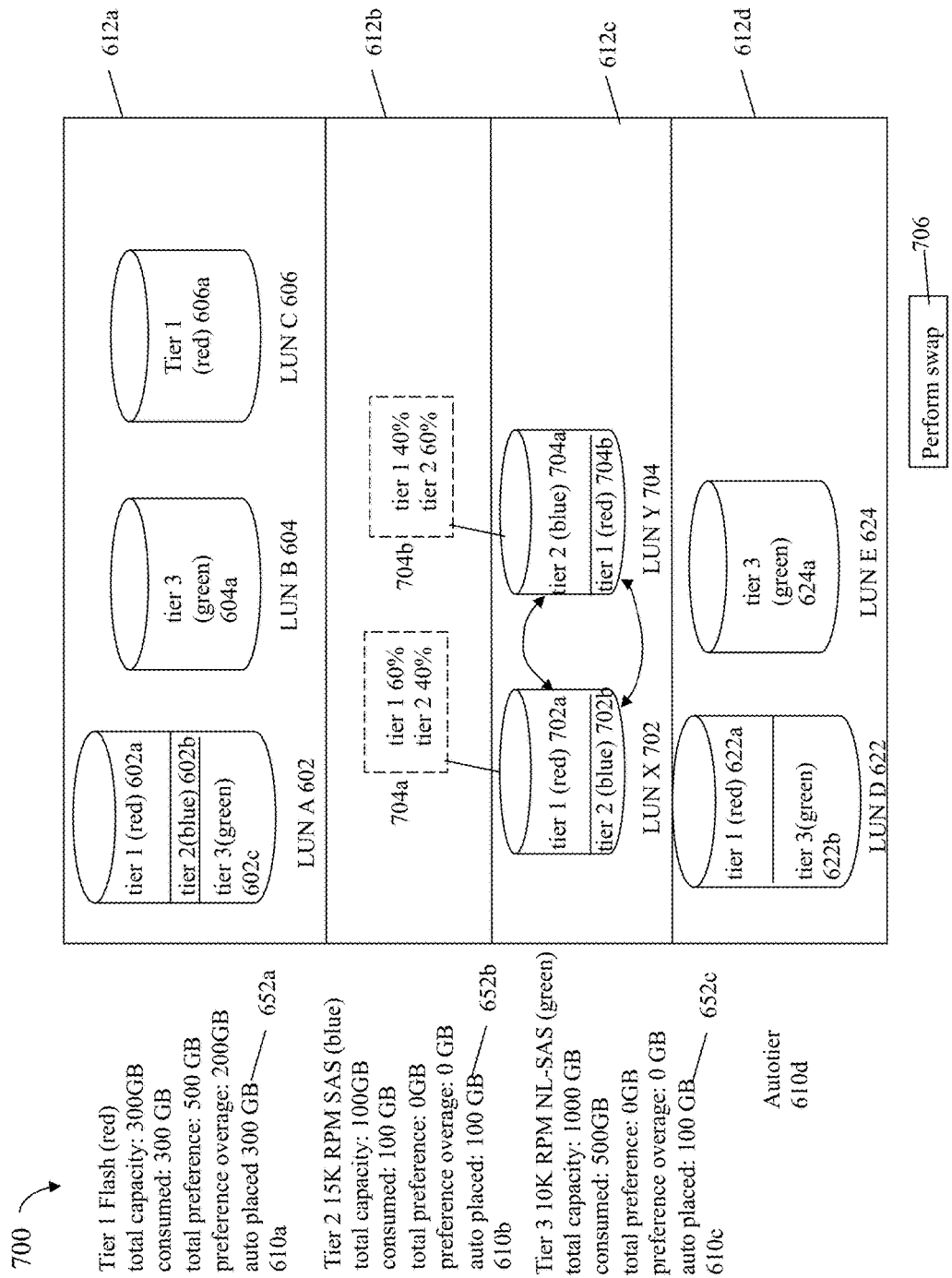

Referring to FIG. 7, shown is a fourth example of a GUI that may be used in an embodiment in accordance with techniques herein. The GUI 700 includes the information as presented in the GUI 650 of FIG. 6B with a few additional items: perform swap button 706, LUNs 702 and 704 placed in area 612c denoting tier 3 as the tiering preference, and elements 704a-b.

LUN X 702 has a tiering preference of tier 3 indicated by placement in area 612c. Consistent with description elsewhere herein, the LUN icon 702 may be encoded with areas 702a-b to denote the relative amounts of data of LUN X 702 stored on each of tiers 1 and 2. In particular, element 702a may have a red color denoting that a portion of LUN X's data is stored on tier 1 and element 702b may have a blue color denoting that remaining data of LUN X is stored on tier 2. The relative sizes of 702a,b may denote the relative amounts of LUN X's data stored on each of the tiers 1 and 2. Similarly, the LUN icon 704 may be encoded with areas 704a-b to denote the relative amounts of data of LUN Y 704 stored on each of tiers 1 and 2. In particular, element 704a may have a red color denoting that a portion of LUN Y's data is stored on tier 1 and element 704b may have a blue color denoting that remaining data of LUN Y is stored on tier 2. The relative sizes of 704a,b may denote the relative amounts of LUN Y's data stored on each of the tiers 1 and 2.

Performing a mouse over or other user interaction with respect to LUN icon 702 may result in displaying 704a denoting the relative percentages of data of LUN X stored on tiers 1 and 2. For example, 60% of LUN X's data is stored on tier 1 and 40% of LUN X's data is stored on tier 2. The information in 704a may be color encoded with colors associated with the tiers (e.g., similar to as described elsewhere herein, for example, with elements 603, 605 and 607 of FIG. 6).

Performing a mouse over or other user interaction with respect to LUN icon 704 may result in displaying 704b denoting the relative percentages of data of LUN Y stored on tiers 1 and 2. For example, 60% of LUN Y's data is stored on tier 2 and 40% of LUN Y's data is stored on tier 1. The information in 704b may be color encoded with colors associated with the tiers (e.g., similar to as described elsewhere herein, for example, with elements 603, 605 and 607 of FIG. 6).

Assume in this example that the storage capacity of LUN X 702 and LUN Y 704 are the same. Additionally, the percentage of data of each of the 2 LUNs 702 and 704 stored on each of the tiers is opposite one another. Put another way 60% of LUN X's data is stored on tier 1 and 60% of LUN Y's data is stored on tier 2, and 40% of LUN X's data is stored on tier 1 and 40% of LUN Y's data is stored on tier 2.

An embodiment in accordance with techniques herein may support a swap operation for such a case where the capacity represented by 702a is approximately the same as the capacity represented by 704a, and where the capacity represented by 702b is approximately the same as the capacity represented by 704b. In this case, the two LUNs 702, 704 may be selected for a swap operation where data of the 2 LUNs may be swapped so that 60% of LUN X's data stored on tier 1 as denoted by 702a is swapped with the 60% of LUN Y's data stored on tier 2 as denoted by 704a, and where 40% of LUN X's data stored on tier 2 as denoted by 702b is swapped with the 40% of LUN Y's data stored on tier 1 as denoted by 704b.

Figure 7B:
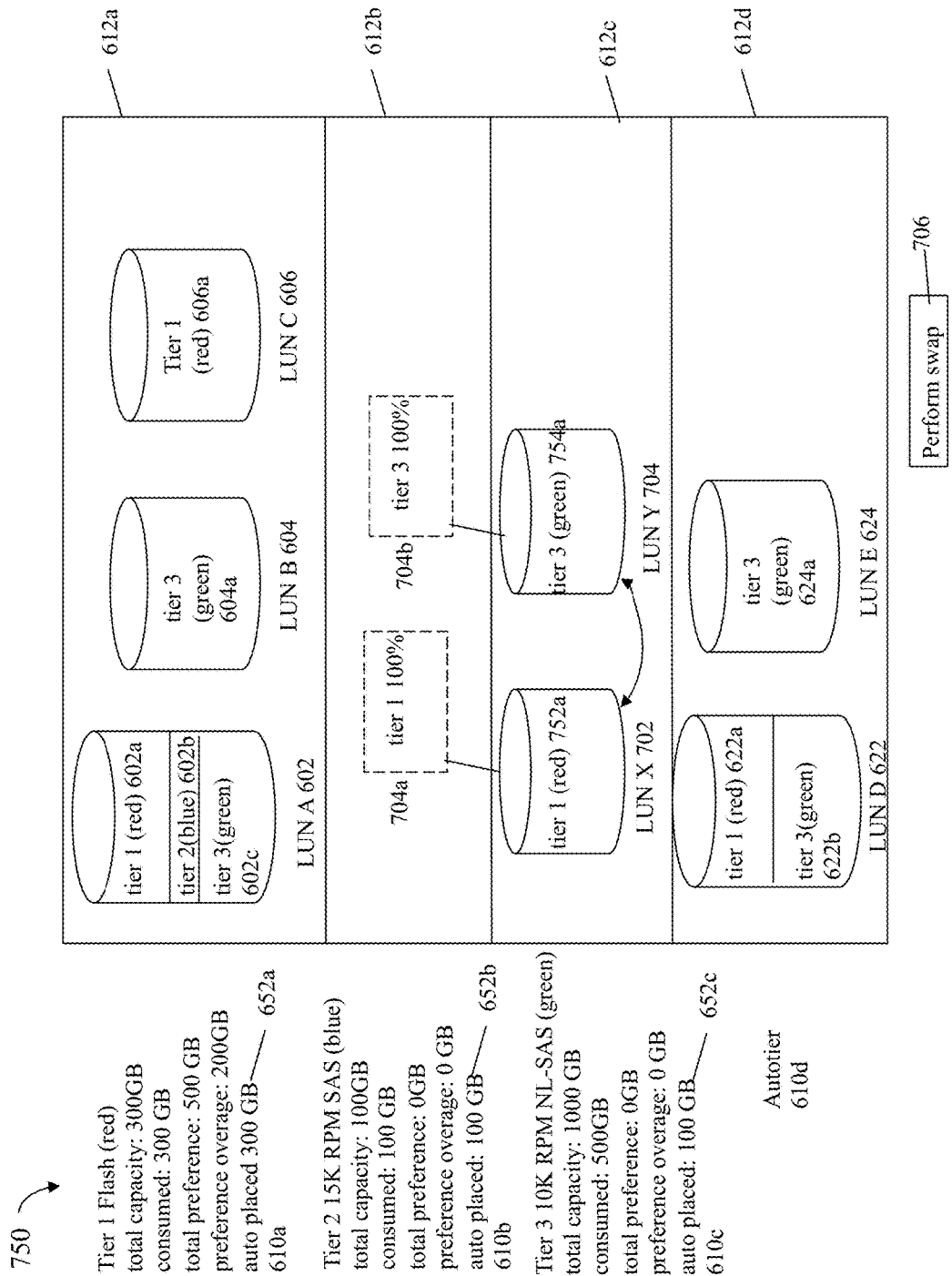

Once LUNs 702, 704 have been selected, a user may then select button 706 to issue a request to the data storage system to perform the above-mentioned data swap. It should be noted that the swap operation may be performed immediately forcing the data swapping operation as soon as it can be processed by the data storage optimizer. It may be desirable to perform such a real-time data movement, for example, if the user wants the swap due to some particular operation or application that will be running where the result of the swap is desired. For example, reference is now made to FIG. 7B which includes the same information as in FIG. 7 with the difference that LUN 702 has its data entirely stored on tier 1 (as denoted by 752a and 704a) and LUN 704 has its data entirely stored on tier 3 (as denoted by 754a and 704b). In this case, performing the swap operation places all of LUN X's data on tier 3 and all of LUN Y's data on tier 1. Such a swap operation may be desired at a current point in time, for example, fi the user is going to perform an operation where the data of LUN Y requires high performance of the flash storage of tier 1 for a brief period of time. The user may realize that I/Os directed to LUN X may be adversely effected but may not be able to wait for the data storage optimizer to perform its own processing and relocate some or all of LUN Y to tier 1.

It should be noted that if the capacities of 702 and 704, or more generally the data portions being swapped between tiers, are not exactly the same size, an embodiment may perform processing to swap the designated data portions between tiers and evict or remove other data from tiers as needed.

Figure 8:
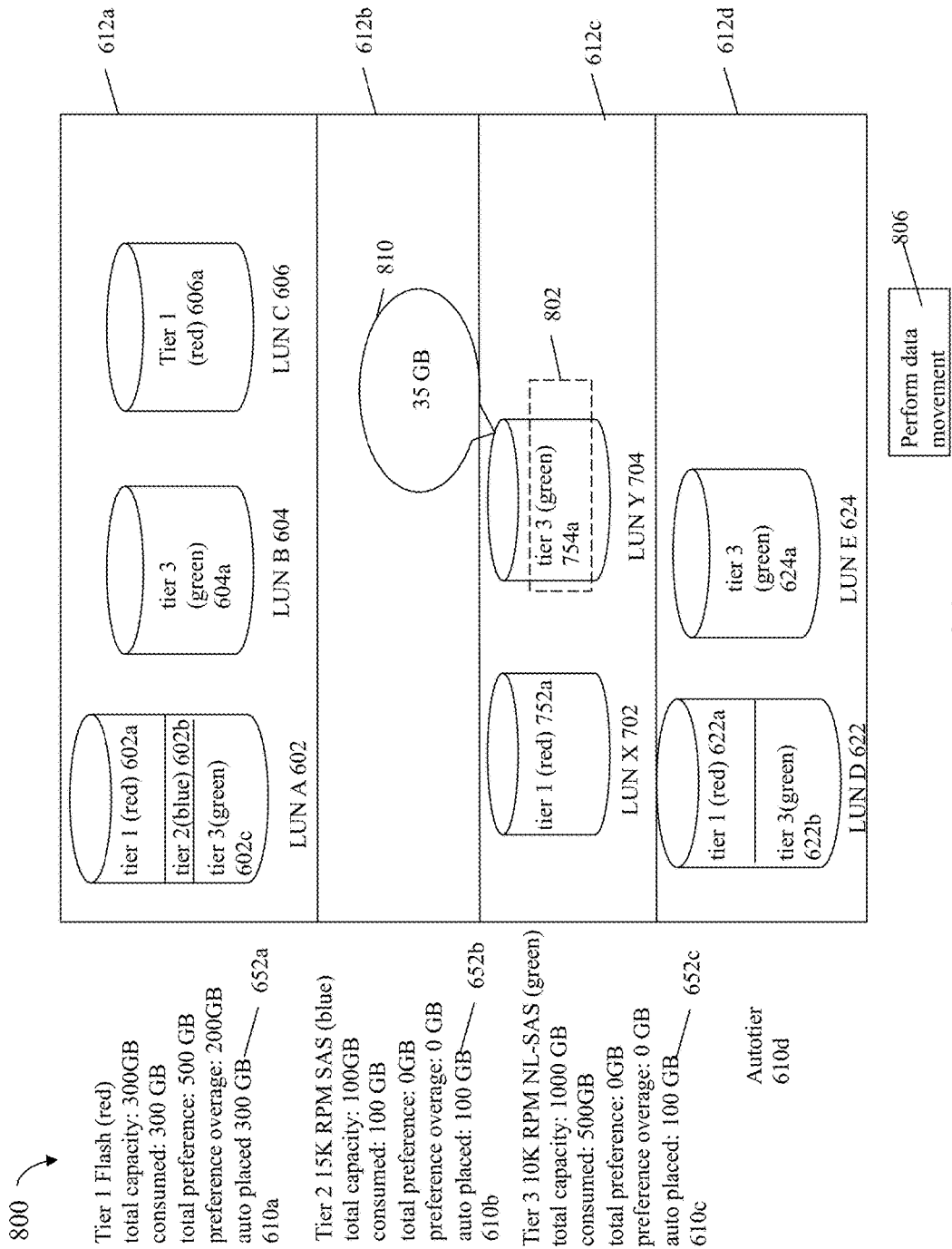

Referring to FIG. 8, shown is a fifth example of a GUI that may be used in an embodiment in accordance with techniques herein. The GUI 800 includes the information as presented in the GUI 700 of FIG. 7B with a few differences. FIG. 8 includes data movement button 806 (rather than element 706), elements 704a-b have been removed, and elements 802 and 810 are new to FIG. 8.

An embodiment may allow a user to select a portion of one or more LUNs to be moved to a target tier. In this example, a user may select a portion of data to be moved, for example, by selecting a portion of a particular LUN. For example, a user may draw box 802 with a mouse or other selection means to denote a portion of data to be moved from a source storage tier. While the user varies the size of the selection box 802 to designate a portion of LUN Y 704, the GUI may be updated to include the information in element 810 denoting the size of the selected data portion 802. As the user may vary (e.g., increase or decrease) 802 to denote a desired amount of data to be moved, the information in 810 may be accordingly updated to reflect the size of 802 in GBs in this example. Once the user has selected a data portion to be moved, the user may designate the target tier to which the selected data portion 802 may be moved. A user may select the target tier or location using any suitable means provided in an embodiment. For example, in one embodiment, the user may simply select one of the storage tiers as the target such as by dragging and dropping box 802 into area 612a (to select tier 1) or into area 612b (to select tier 2). It should be noted that the data portion 802 may denote 35 GB of data stored on tier 3. The exact data of LUN Y moved may be selected by the data storage optimizer depending on the target tier. Assume in this example, the user selects tier 1 612a as the target tier having no free capacity. Once the target tier has been selected, the user may select button 806 to perform the requested data movement. At this time, the data storage optimizer may perform processing to select 35 GB of existing data currently stored on tier 1 for eviction or relocation to another tier. For example, the data storage optimizer may simply swap 35 GB of existing data currently stored on tier 1 with the selected 35 GB of LUN Y data currently stored on tier 3.

The data storage optimizer may select the 35 GB of data moved from tier 1 to tier 3 using any suitable criteria. For example, in one embodiment, the data storage optimizer may use criteria including any of current I/O workload of the data portions currently stored in tier 2, the relative priority assigned to particular data portions or LUNs denoting relative importance of different LUNs, and the like. For example, since data is being selected from tier 1 to be moved to tier 3, the data storage optimizer may select the most inactive data portions having the lowest I/O workload to be moved from tier 1 to tier 3. As another option, LUN priority may be considered. For example, in one embodiment, each LUN, and also sub-LUN portions, may each have an associated relative priority denoting a relative level of importance of data stored on particular LUNs, or portions of a LUN logical address space. In this manner, data portions having a lowest priority may be selected for movement from tier 1 to tier 3 so that data denoted by 802 may be moved to tier 1.

As another option, an embodiment may allow the user to select with greater specificity the particular target location to which data portion 802 is moved. As noted above, a user may select a tier as the target. An embodiment further allow a user to designate one or more LUNs whose data is to be moved from tier 1 to make room for storing data portion 802. For example, a user may select LUN C 606 where 35 GB of LUN C's data may be swapped with the 35 GB data portion denoted by 802.

The movement of data portion 802 to the flash tier 1 may be scheduled and happen at a later point in time, or may commence immediately responsive to selection of 806. In one embodiment, selection of 806 may result in a request being issued to the data storage optimizer to perform, on demand, the requested data movement illustrated in FIG. 8.

As described herein, the GUI may display information regarding a particular number of LUNs. In a data storage system, there may be hundreds or even thousands of LUNs and not all information regarding all LUNs may be able to be displayed on the GUI. As such, filtering criteria may be specified, such as by user selection, affecting what particular LUNs are included in the GUI.

Figure 9:
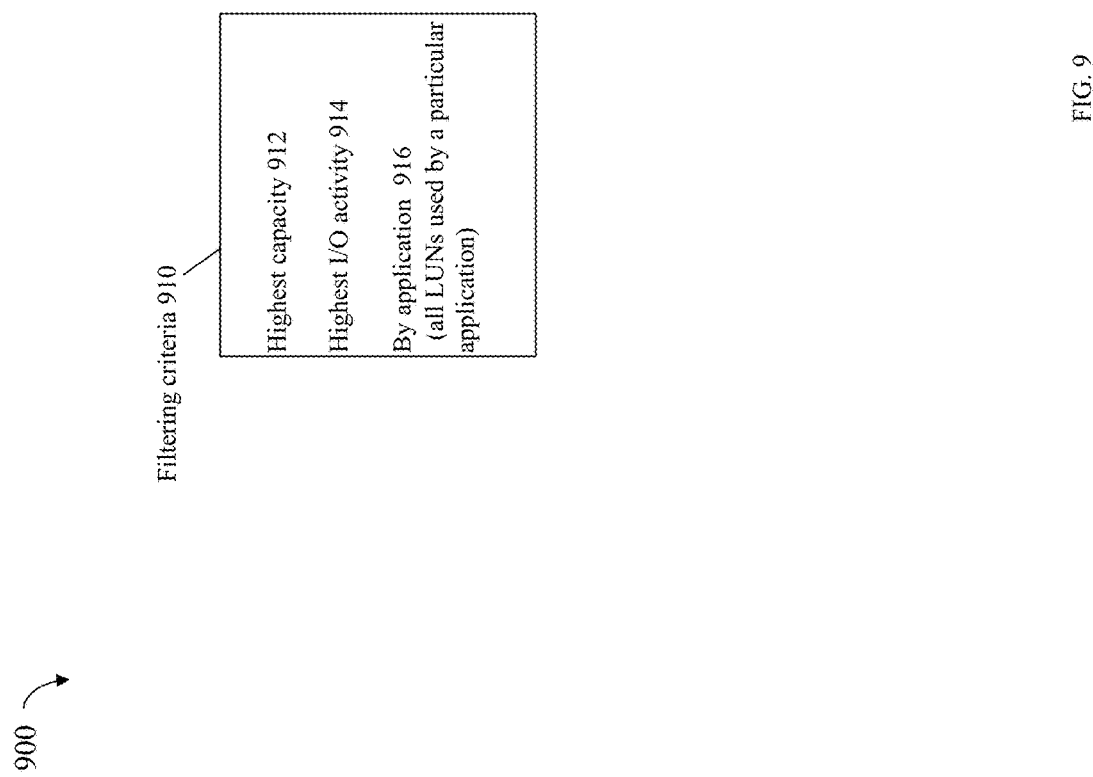
FIG. 9 is an example illustrating filtering criteria that may be used in an embodiment in accordance with techniques herein.

Referring to FIG. 9, shown is an example of filtering criteria 910 that may be used in an embodiment in accordance with techniques herein. The filtering criteria selected may be based on any one or more of LUN capacity, I/O activity, and application. For example, a user may select highest capacity 912 as filtering criteria whereby a specified number of LUNs having the highest capacity may be included in the GUI display. A user may select highest I/O activity 914 as filtering criteria whereby a specified number of LUNs having the highest I/O activity or I/O workload observed may be included in the GUI display. A user may select a particular application 916 whereby a specified number of LUNs used by the particular application selected may be included in the GUI display. For example, LUNs may be provisioned on a data storage system for many different applications, such as one or more email server applications (such as Microsoft Exchange™), one or more database server applications (such as Oracle database server applications or an SQL database), or more generally any one or more applications.

In one embodiment, a LUN may have an associated metadata tag denoting the particular application(s) having data stored on the LUN. The tag may denote the application name or instance selected from a menu or may simply be a text string of keywords denoting the particular application. When entering the filtering criteria identifying one or more particular applications 916, a user may, for example, select a particular application from a drop down list of predetermined applications, may enter keywords which may be matched against the application metadata tag (e.g., match between filtering criteria keyword and LUN tag denoting an application results in the associated LUN being included in the GUI display), and the like.

In one embodiment, information denoting the particular application having its data stored on a particular LUN may be identified in an I/O request or data operation (e.g., to read and/or write data) such as sent from the host to the data storage system. For example, an application may send a write operation directed to a LUN to the data storage system. The write operation may include information identifying the particular application sending the write operation.

The foregoing are examples of ways in which a particular LUN may be associated or "tagged" as being used by a particular application. More generally, any suitable technique may be used to associate a particular LUN as being used by (or including data for) a particular application.

Thus, based on one or more filtering criteria specified, information regarding a specified maximum number of LUNs meeting the filtering criteria may be displayed in GUIs in an embodiment in accordance with techniques herein. The particular maximum number may vary, for example, with the size of the screen or other display device used to display the GUIs.

Figure 10:
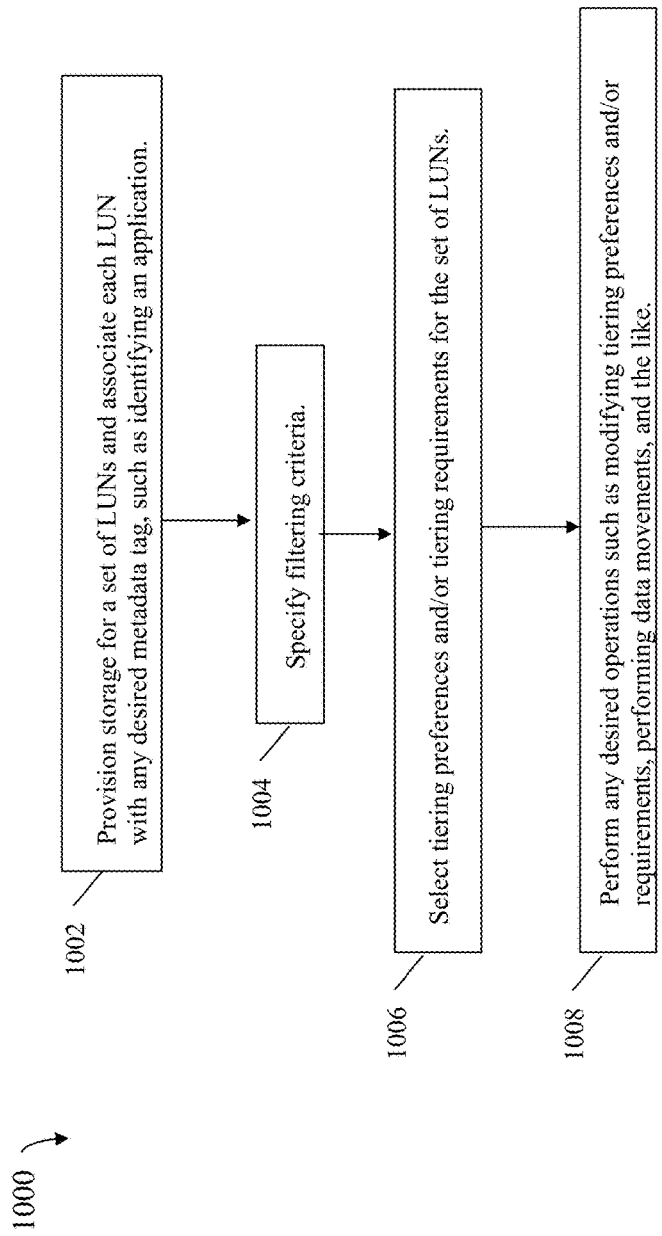
FIG. 10 is a flowchart of processing steps that may be performed in an embodiment in accordance with techniques herein.

Referring to FIG. 10, shown is a flowchart of processing step that may be performed in an embodiment in accordance with techniques herein. The flowchart 1000 summarizes processing described above. At step 1002, storage may be provisioned for a set of LUNs. Each of the LUNs in step 1002 may also be associated with any desired metadata tags such as identifying an application as described herein. At step 1004, one or more filtering criteria may be specified such as described in connection with FIG. 9. At step 1006, a GUI of the data storage management application may be displayed and a user may use the GUI to select tiering preferences and/or tiering requirements for the displayed set of LUNs. The set of LUNs for which information is displayed in the GUI may be in accordance with the filtering criteria specified in step 1004. At step 1008, the GUI may be further used in performing any desired operation such as modifying tiering preferences and/or requirements, performing data movements, and the like.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A non-transitory computer readable medium comprising code stored thereon, that when executed, performs a method of processing data storage management operations comprising:
displaying a graphical user interface including a plurality of areas each associated with one of a plurality of tiering preferences, said graphical user interface including a plurality of user interface elements representing a plurality of logical devices, each of the plurality of user interface elements denoting one of the plurality of logical devices located in one of the plurality of areas to thereby indicate any of a tiering preference and a tiering requirement for said one logical device; and
performing first processing to modify a tiering preference for a first of the plurality of logical devices, said first processing including:
selecting the first logical device by selecting a first of the plurality of user interface elements representing the first logical device; and
moving the first user interface element from a first of the plurality of areas to a second of the plurality of areas, the first area denoting a first tiering preference and the second area denoting a second tiering preference where a current tiering preference for the first logical device is modified from the first tiering preference to the second tiering preference, wherein the plurality of logical devices are included in a data storage system including a plurality of storage tiers and wherein the plurality of tiering preferences include the plurality of storage tiers, and wherein the plurality of tiering preferences includes an automated tiering preference denoting that no particular one of the plurality of storage tiers is preferred for storing data of a logical device, and wherein the method further includes:
determining, by a data storage optimizer, a data movement to automatically move a first data portion from a first of the plurality of tiers to a second of the plurality of storage tiers, the data movement being determined using information including any of I/O workload of data portions of the plurality of logical devices and tiering preferences for the plurality of logical devices.

2. The non-transitory computer readable medium of claim 1, wherein a second of the plurality of user interface elements represents a tiering requirement for a second of the plurality of logical devices, the second user interface element being included in one of the plurality of areas associated with one of the plurality of tiering preferences, and wherein the second user interface element includes a visual indicator denoting that the one tiering preference is a tiering requirement for the second logical device.

3. The non-transitory computer readable medium of claim 2, wherein data of the second logical device is stored only on a storage tier associated with the one tiering preference and the data storage optimizer does not relocate data for the second logical device.

4. A non-transitory computer readable medium comprising code stored thereon that, when executed, performs a method of processing data storage management operations comprising:
displaying a graphical user interface including a plurality of areas each associated with one of a plurality of tiering preferences, said graphical user interface including a plurality of user interface elements representing a plurality of logical devices, each of the plurality of user interface elements denoting one of the plurality of logical devices located in one of the plurality of areas to thereby indicate any of a tiering preference and a tiering requirement for said one logical device; and performing first processing to modify a tiering preference for a first of the plurality of logical devices, said first processing including:

selecting the first logical device by selecting a first of the plurality of user interface elements representing the first logical device; and moving the first user interface element from a first of the plurality of areas to a second of the plurality of areas, the first area denoting a first tiering preference and the second area denoting a second tiering preference where a current tiering preference for the first logical device is modified from the first tiering preference to the second tiering preference, wherein the plurality of logical devices are included in a data storage system including a plurality of storage tiers and wherein the plurality of tiering preferences include the plurality of storage tiers, wherein each of the plurality of user interface elements is encoded with information denoting which one or more of the plurality of storage tiers includes data of one of the plurality of logical devices associated with said each user interface element, and wherein the first user interface element is encoded with information denoting that data of the first logical device is included in at least two of plurality of different storage tiers.

5. The non-transitory computer readable medium of claim 4, wherein the first user interface element includes a plurality of partitions each being associated with one of the at least two different storage tiers and wherein said each partition has a relative size denoting an amount of data of the first logical device stored on said one storage tier associated with said each partition.

6. The non-transitory computer readable medium of claim 4, wherein the method further comprises:
specifying one or more filtering criteria; and
selecting the plurality of logical devices from a set of logical devices in accordance with the one or more filtering criteria.

7. The non-transitory computer readable medium of claim 6, wherein the one or more filtering criteria includes any of: select a number of logical devices from the set based on storage capacity, select a number of logical devices from the set based on I/O workload, and select a number of logical devices associated with a specified application.

8. The non-transitory computer readable medium of claim 7, wherein at least one of the logical devices has an associated metadata tag identifying that the at least one logical device is associated with a particular application.

9. The non-transitory computer readable medium of claim 7, wherein at least one of the logical devices is associated with a particular application identified in an I/O operation received from the particular application.

10. The non-transitory computer readable medium of claim 4, wherein the method further comprises:
determining, by a data storage optimizer, a data movement to automatically move a first data portion from a first of the plurality of tiers to a second of the plurality of storage tiers, the data movement being determined using information including any of I/O workload of data portions of the plurality of logical devices and tiering preferences for the plurality of logical devices.

11. A system comprising:
a processor; and
a memory comprising code stored thereon that, when executed by the processor, performs a method of processing data storage management operations comprising:

displaying a graphical user interface including a plurality of areas each associated with one of a plurality of tiering preferences, said graphical user interface including a plurality of user interface elements representing a plurality of logical devices, each of the plurality of user interface elements denoting one of the plurality of logical devices located in one of the plurality of areas to thereby indicate any of a tiering preference and a tiering requirement for said one logical device; and performing first processing to modify a tiering preference for a first of the plurality of logical devices, said first processing including:

selecting the first logical device by selecting a first of the plurality of user interface elements representing the first logical device; and moving the first user interface element from a first of the plurality of areas to a second of the plurality of areas, the first area denoting a first tiering preference and the second area denoting a second tiering preference where a current tiering preference for the first logical device is modified from the first tiering preference to the second tiering preference, wherein the plurality of logical devices are included in a data storage system including a plurality of storage tiers and wherein the plurality of tiering preferences include the plurality of storage tiers, wherein each of the plurality of user interface elements is encoded with information denoting which one or more of the plurality of storage tiers includes data of one of the plurality of logical devices associated with said each user interface element, and wherein the first user interface element is encoded with information denoting that data of the first logical device is included in at least two of plurality of different storage tiers.

12. The system of claim 11 wherein the first user interface element includes a plurality of partitions each being associated with one of the at least two different storage tiers and wherein said each partition has a relative size denoting an amount of data of the first logical device stored on said one storage tier associated with said each partition.

13. The system of claim 11, wherein the method further comprises:
specifying one or more filtering criteria; and
selecting the plurality of logical devices from a set of logical devices in accordance with the one or more filtering criteria.

14. The system of claim 13, wherein the one or more filtering criteria includes any of: select a number of logical devices from the set based on storage capacity, select a number of logical devices from the set based on I/O workload, and select a number of logical devices associated with a specified application.

15. The system of claim 14, wherein at least one of the logical devices has an associated metadata tag identifying that the at least one logical device is associated with a particular application.

16. The system of claim 14, wherein at least one of the logical devices is associated with a particular application identified in an I/O operation received from the particular application.

17. The system of claim 11, wherein the method further comprises:

determining, by a data storage optimizer, a data movement to automatically move a first data portion from a first of the plurality of tiers to a second of the plurality of storage tiers, the data movement being determined using information including any of I/O workload of data portions of the plurality of logical devices and tiering preferences for the plurality of logical devices.

18. A system comprising:

a processor; and a memory comprising code stored thereon that, when executed by the processor, performs a method of processing data storage management operations comprising:

displaying a graphical user interface including a plurality of areas each associated with one of a plurality of tiering preferences, said graphical user interface including a plurality of user interface elements representing a plurality of logical devices, each of the plurality of user interface elements denoting one of the plurality of logical devices located in one of the plurality of areas to thereby indicate any of a tiering preference and a tiering requirement for said one logical device; and performing first processing to modify a tiering preference for a first of the plurality of logical devices, said first processing including:

selecting the first logical device by selecting a first of the plurality of user interface elements representing the first logical device; and moving the first user interface element from a first of the plurality of areas to a second of the plurality of areas, the first area denoting a first tiering preference and the second area denoting a second tiering preference where a current tiering preference for the first logical device is modified from the first tiering preference to the second tiering preference, wherein the plurality of logical devices are included in a data storage system including a plurality of storage tiers and wherein the plurality of tiering preferences include the plurality of storage tiers, and wherein the plurality of tiering preferences includes an automated tiering preference denoting that no particular one of the plurality of storage tiers is preferred for storing data of a logical device, and wherein the method further includes:

determining, by a data storage optimizer, a data movement to automatically move a first data portion from a first of the plurality of tiers to a second of the plurality of storage tiers, the data movement being determined using information including any of I/O workload of data portions of the plurality of logical devices and tiering preferences for the plurality of logical devices.

* * * * *